March 19, 1968   J. M. DUNSMORE ET AL   3,374,140

LOCATOR DEVICE

Filed Jan. 7, 1965   2 Sheets-Sheet 1

INVENTORS
James M. Dunsmore and
BY Harry C. Reimschussel

Nobbe & Swope
ATTORNEYS

March 19, 1968     J. M. DUNSMORE ET AL     3,374,140
LOCATOR DEVICE
Filed Jan. 7, 1965     2 Sheets-Sheet 2
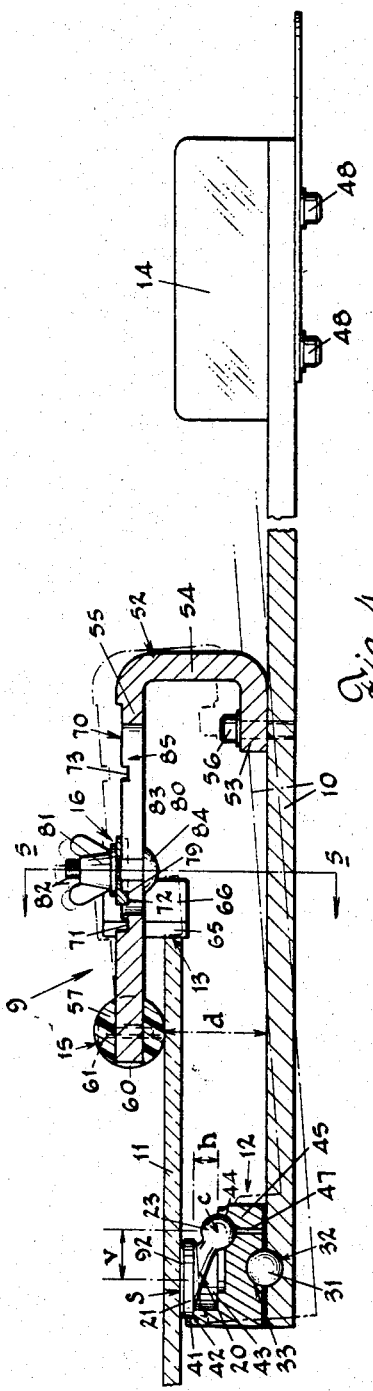
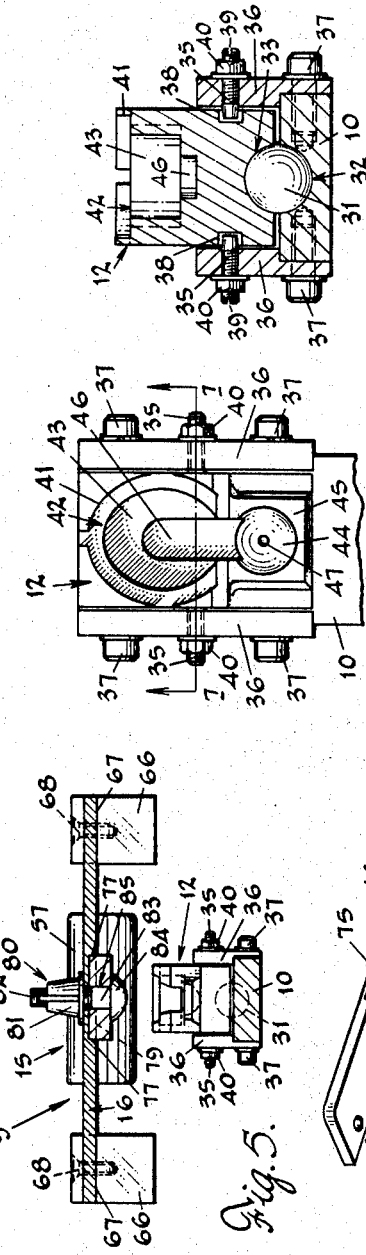
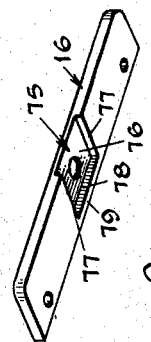
INVENTORS
James M. Dunsmore and
BY Harry C. Reimschussel
Nobbe & Swope
ATTORNEYS United States Patent Office 3,374,140
Patented Mar. 19, 1968

3,374,140
LOCATOR DEVICE
James M. Dunsmore and Harry C. Reimschussel, Toledo, Ohio, assignors to Libbey-Owens-Ford Glass Company, Toledo, Ohio, a corporation of Ohio
Filed Jan. 7, 1965, Ser. No. 424,080
15 Claims. (Cl. 156—580)

The present invention relates broadly to locating and mounting devices and more particularly to an improved tool for positioning rear view mirror brackets with respect to a windshield and mounting the same thereon.

The main object of this invention is to provide an improved device for locating rear view mirror mounting brackets accurately and rapidly in a predetermined area of an automobile windshield and to facilitate the securing of the brackets in place.

Another object of the invention is to provide a locator device of the above character which can be manually employed to position a mounting bracket in a predetermined location on a windshield and be freely removed from the bracket and windshield after an adhered relation has been established therebetween.

Other objects and advantages of the invention will become more apparent during the course of the following description when read in connection with the accompanying drawings.

In the drawings, wherein like numerals are employed to designate like parts throughout the same:

FIG. 4 is a side elevation, parts thereof being shown in cross-section;

FIG. 5 is a transverse vertical section taken on line 5—5 of FIG. 4;

FIG. 6 is an enlarged fragmentary plan view of one end of the device;

FIG. 7 is a transverse vertical section taken on line 7—7 of FIG. 6; and

FIG. 8 is a perspective view of a cross bar of the device.

Briefly stated, the locating device of this invention is adapted to be employed in the attachment of a rear view mirror mounting bracket to the inner surface of an automobile windshield or the like. To this end, the locator device is equipped with a bracket carrier block which is so mounted on the device as to permit the attaching surface of the bracket to be rapidly and easily brought into full contacting engagement with the windshield surface. Additionally, the locator device is provided with a cylindrical support element which, while placed on the opposite surface of the windshield, permits the bracket to be properly located, while spaced from the windshield, and then immediately moved into contact therewith. In this connection the locator device is also equipped to so locate the bracket with reference to the adjacent upper or top edge that its mounted position will be accurately determined both as to the distance from the proximate edge and as to the line of a plane perpendicular or normal to the edge. A weighted opposite end of the device serves to firmly press the attaching surface of the bracket, while the same is mounted in the carrier block, against the windshield until an adhering medium has effected a completely bonded relation of the bracket to the glass surface.

Figure 1:
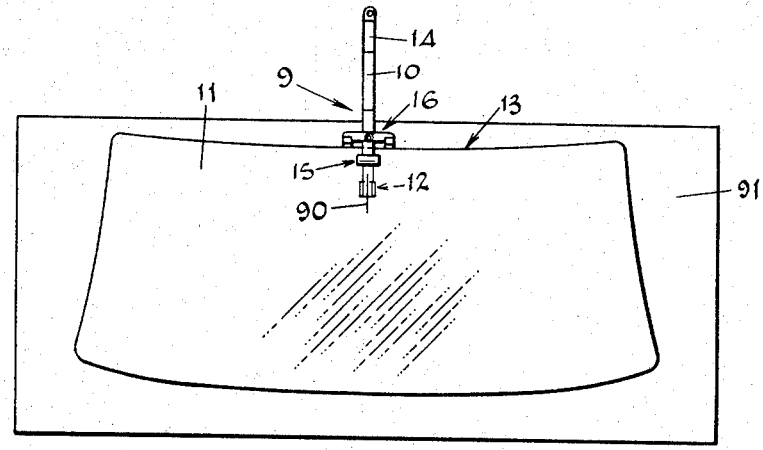
FIG. 1 is a plan view of an automobile windshield with a locator device, constructed in accordance with the invention, mounted thereon.

Thus, as shown in FIG. 1 of the drawings, a locator device, constructed in accordance with the invention and generally designated by the numeral 9, is illustrated in mounted position with reference to a glass sheet or windshield 11. As briefly mentioned above, the locator device 9, including a base element or lever bar 10, mounts a bracket carrier block 12, at one end of said lever, adapted to be predeterminedly positioned adjacent one surface of the sheet and with reference to an edge 13 thereof. A weighted member 14 is located at the opposite end of the lever bar 10. Suitably spaced from the block 12, a support element 15 is provided on the device to support the same on an opposite surface of the sheet and for pivotal movement whereby the carrier block, including a mounting bracket, can be suitably located while spaced from the surface of the sheet and then brought into firm and full contact therewith. Such location of the bracket is obtained by a bar or cross-arm 16 adapted to engage the edge of the sheet thereby positioning the bracket at a desired distance from said edge and simultaneously in the plane of a line parallel a line along the transverse axis of the sheet if not coincident therewith. In this respect, it will be seen that the cross-arm or locator member 16, together with lever bar 10, functions in a manner similar to that of the well known draftsman's "T-square" to determine the position of the bracket along a theoretical line perpendicular or normal to the reference edge.

Figure 2:
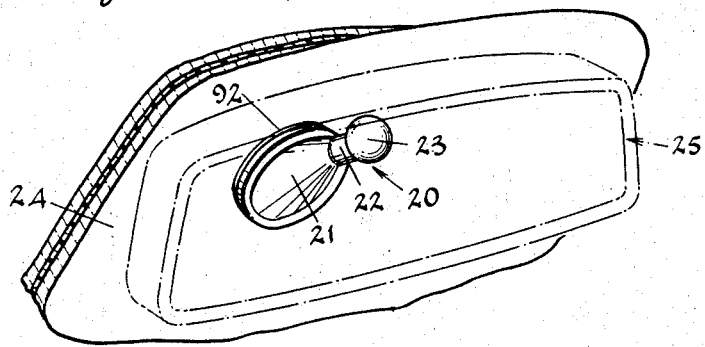
FIG. 2 is a fragmentary perspective view of a portion of a windshield with a rear view mirror mounting bracket attached to the inner surface thereof.

Referring now to FIG. 2, a typical form of rear view mirror mounting bracket, designated by the numeral 20, includes a base 21, an arm 22 and a spherical support element or ball-end 23; the base 21 being attached to the inner surface of an automobile windshield 24 and the arm 22 directed outwardly along a plane substantially perpendicular thereto. A mirror case 25, indicated in broken line, is adapted, in one way or another, to be carried by the ball-end 23 and to permit the mirror to be angularly adjusted according to the viewing position desired by a driver or other occupant of the automobile. In this connection, the bracket 20 is usually attached to the inner surface of the windshield before it is installed in its functional position within an automobile body and preferably such attachment can be carried out as a final operation in the production thereof.

With more particular reference to the locator device 9, it will be seen in FIGS. 3 to 7, to include an elongated lever bar or base member 10 which not only serves to mount the carrier block 12, the weight 14, the support member 15 and cross-arm 16 but as the handle portion by which the locator device per se is conveniently gripped and manipulated.

The carrier block 12, as viewed in FIGS. 4, 6 and 7, is positioned at one end of the bar 10 and is thereon supported on a ball 31 that is seated in a hemi-spherical recess or socket 32 in the bar and received in a similarly formed recess or socket 33 in the bottom of the block. This permits substantial freedom of movement for the block about a vertical axis for reasons to be hereinafter more fully described in detail. The block is loosely retained on the ball support 31 by screws 35 that are threaded through keeper plates 36, secured to the sides of the bar 10 by screws 37. The inwardly directed ends of screws 35 are received in recesses 38 (FIG. 7) formed in the respective sides of the block and are adapted to be adjusted inwardly and outwardly by the provision of slots 39 in their outer ends. Lock-nuts 40 serve to secure the screws in the adjusted positions.

As seen in FIGS. 4 and 6, the body portion of the block is formed with suitably related recessed areas in which the base and ball element of a mounting bracket are adapted to be readily placed. With respect to the exemplary type of bracket herein disclosed, the recess for receiving the base of a bracket is formed substantially in the major top surface of the block while the recess for the ball element is disposed in a minor top surface located in downwardly "stepped" relation to the major top surface. For this purpose, the base recess 41 is defined by an oval outline and has a depth approximately the thickness of the base. A ledge or shoulder area 42 for supporting the base portion of the bracket is created by the provision of a second or inner bottoming recess 43 extending downwardly into the body portion of the block.

The recess 44 for receiving the ball element is formed as a hemispherical cavity in a downwardly stepped end portion 45 of the block with the center point $c$ of the cavity being accurately located beneath the level or horizontal plane of the shoulder 42 to agree with the actual dimensional distances of the bracket per se, as indicated by the letter $h$ in FIG. 4. This is also true with regard to the spaced distance between a vertical plane through the transverse axis of the recess 41 and a similar vertical plane through the center point of the recess 44, as indicated by the letter $v$ in the same figure. In this connection, it is believed apparent that the recesses 41 and 44 in carrier blocks for a variety of mounting brackets can be formed to suit the variations of dimension as determined by the distances $h$ and $v$ and within the spirit of this invention.

Moreover, the vertical planes through the longitudinal axes of the recess 41 and of the center point $c$ of the recess 44 are accurately located in a coincident plane whereby the vertical plane through the longitudinal vertical axis of a mounting bracket will be judged to be perpendicular to the shoulder 42. This, in part, ensures that the base of the bracket will be substantially parallel with the surface of a windshield when placed thereagainst.

The aforementioned recess 43 and a "bottoming" groove 46, opening into the recessed cavity 44, define an open relief area of suitable size for freely receiving the arm portion of a mounting bracket. Also, the block 12 is provided by a vertically disposed "pore" hole 47 opening into the cavity 44 and thereby permitting ready escape of fluids employed in the mounting operation.

Figure 3:
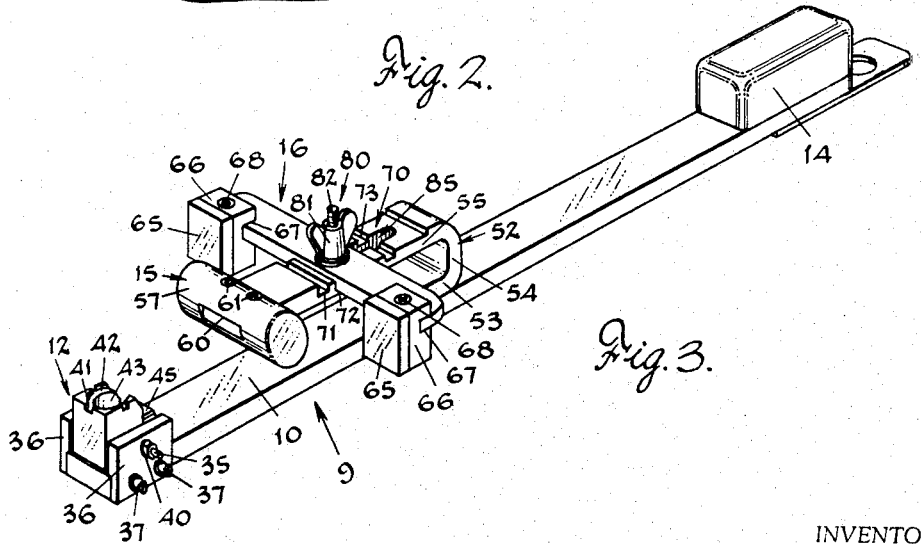
FIG. 3 is a perspective view of the locator device.

The weight member 14, as in FIGS. 3 and 4, is attached to the opposite or rear end of the elongated lever 10 by means of machine screws 48.

The support member 15 and cross-arm 16 are mounted in upwardly spaced, parallel relation to the lever bar or base member 10 by means of a J shaped member 52 having a short leg mounting portion 53, a vertically disposed web section 54 and a horizontally disposed long leg portion 55. The leg portion 53 is fixed to the upper surface of the base member 10 by machine screws 56 in spaced relation to the carrier block 12. The support member 15, as herein provided, comprises a cylindrical block 57 of heat-resistant plastic material which is non-abrasive to a glass surface. The cylindrical block 57 is formed with a central, horizontally disposed slot 60 having an open area adapted to receive the projecting end of leg portion 55; said member 15 being secured thereon by screws 61. In this respect, it is to be noted that a preferred dimensional distance, indicated by the letter $d$, of the surface of the support member 15, opposite to and spaced from the upper surface of the lever bar or base member 10, should be substantially equal to the height elevation of a bracket base when supported in the carrier block plus an average thickness of a solid or laminated safety glass sheet. The length of the web section 54 can thus be determined.

The cross-arm 16, also carried by the member 52, is mounted thereon for longitudinal adjustment relative to the lever bar 10, and particularly with reference to the carrier block 12, and is equipped with the sheet edge contacting pads 65 which are adapted to engage the proximate edge of a windshield and thus establish the perpendicular relation of a mounting bracket thereto. For this purpose, each pad 65 comprises a relatively thin piece or block of plastic adhered to the surface of a block 66, which is notched as at 67 for receiving an end part of the cross-arm 16 with screws 68 passing through said arm and threadedly received in the blocks. Generally stated, the blocks 66 are located symmetrically equidistant from the longitudinal axis of the lever bar 10 and with the surfaces of the pads 65 perpendicular thereto. When functionally positioned against the edge of the windshield, the pads 65 thus operate in substantially the same manner as the cross-head of a "T-square" whereby the lever bar 10 will be disposed at a right angle to the said edge.

As viewed in FIG. 4, the upper surface of the leg 55 is relieved to provide a recessed surface 70 in which there are provided transverse notches 71, 72 and 73. These notches are selectively spaced from one another to provide a convenient way for locating the contacting surfaces of the pads 65 at various predetermined distances from the transverse vertical axis of the carrier block 12. In other words, the notches 71, 72 and 73 are formed in the recessed surface 70 to agree with at least three selected distances that a mounting bracket is to be located from the upper edge of a windshield.

With reference now to FIG. 8, the cross-arm 16 is formed in its undersurface with a centrally disposed substantially rectangular recess 75 defined by a horizontal surface 76, opposed side surfaces 77 and an end surface 78; the width of the recess 75 between side surfaces 77 being substantially equal to the width of the leg portion 55. The end surface 78 is spaced from the adjacent edge surface of the cross-arm to form a "key" portion 79 which interfits within any of the notches 71, 72 or 73. The cross-bar is thus adapted to be selectively located with ease and secured with respect to the selected one of notches 71–73 by means of a "step" bolt 80 and wing-nut 81. The bolt 80 is conventionally formed beneath a threaded outer end 82 with a square shank portion 83, adjoining the head 84, that is slidably received in an elongated slot 85 provided in and along the central area of the leg portion 55 of the member 50. It is believed apparent that the cross-arm can be released from a secured position relative to any one of the notches 71–73 and placed in another selected notch upon loosening of the wing-nut 81 and adjusting the square shank 83 lengthwise within the slot 85.

In again considering FIGS. 1 and 4, the locator device 9 will thus be seen as substantially freely and swingably mountable relative to the outer, upwardly directed surface of a glass sheet or windshield 11 by means of the cylindrical support member 15 to accurately locate a mounting bracket 20 in position to be attached to the opposite or inner surface of a windshield. As a aforementioned, the base 21 of a mounting bracket is so positioned on the carrier block 12 that the surface $s$ thereof is theoretically parallel to the glass surface. However, since the block 12 is supported on the ball 31, it is adapted to shift radially or "wobble" about on the ball as the base is brought into surface contact thereby eliminating any possibility for the block to restrain the bracket in any position other than one in which the vertical plane of the bracket will be perpendicular or normal to the surface to which it will be attached. Additionally, the pads 65, as viewed in FIG. 1, are engaged with the edge of the sheet or windshield and thus function to determine the inward predetermined distance of the bracket from the said edge and further to insure that the longitudinal, vertical plane of the bracket will be parallel to, or coincident with, a plane through the transverse axis of the sheet or windshield.

In practical use, a positioning line, indicated at 90 in FIG. 1, is scribed with a glass marking pencil on the upper surface of the windshield 11 along the transverse axis thereof and perpendicular to the adjacent edge 13. The windshield is supported on a table or like surface 91, and in the event that the glass sheet or windshield is bent about the transverse axis, suitable blocks can be employed to locate the windshield horizontally or in order that the locator device 9 can be conveniently inserted between the lower surface of the windshield and the supporting surface.

In order to ensure a permanent bond between the mounting bracket 20 and the surface of the windshield, a layer 92 of a suitable adhesive is provided therebetween; said layer being of similar area and outline as the base 21 of the bracket. This adhesive layer is preferably composed of vinyl butyral resin plasticized with a suitable plasticizer, such as triethyleneglycol di-2-ethyl-butyrate, and a quantity of liquid solvent plasticizer such as 2-ethylhexyl diphenyl phosphate. The bracket is then placed in the block 12 with the base 21 being received on the shoulder 42 of the recess 41; the arm 22 in the recess 43 and the ball element 23 in the recess 44. The locator device, together with the bracket, is then placed for several minutes in a heating oven (not shown) maintained at approximately 200° F. After an interval of 5 minutes, by way of example, the device 9 is removed from the oven and a drop or small quantity of liquid solvent plasticizer, such as 2-ethylhexyl diphenyl phosphate, is applied to the softened surface of the thermoplastic piece 92. In this connection, excess quantities of the liquid escaping from the surface of the layer 92 and flowing over the bracket into the cavity 44 will be drained from the block through the pore hole 47.

The locator device is then brought into an initial position with reference to the windshield, as shown in FIG. 1 and indicated in broken line in FIG. 4, with the support member 15 resting on the upwardly directed surface of the windshield and the pads 65 of the cross-bar coming into engagement with the proximate upper or top edge 13 of the windshield. The layer 92 is thereby spaced from the surface of the windshield while the lever bar 10 is held so that the device per se by the member 15 rests lightly on the windshield and the surface of the layer 92 is disposed in spaced relation from the surface to which it is to be bonded. During such initial positioning, the device can be bodily shifted laterally, with the pads 65 bearing on the edge 13, until the base 21 registers with the positioning line 90. Now, since the cross-arm 16 is secured with respect to a selected notch 71, 72 or 73, the base 21 will be spaced the predetermined distance from the top edge 13 while by the pads 65, the base will also be disposed in perpendicular relation thereto. By manually swinging or tilting the device on a fulcrum point afforded by the support member 15, the layer is brought into full contact with the glass surface. Upon manual release of the lever bar 10, the weighted end 14 is adapted to exert sufficient pressure to the carrier block 12 to ensure that a permanently bonded relation will be established.

As hereinabove pointed out, the carrier block 12 is supported on the ball 31 which permits it to freely shift radially thereupon to further achieve a complete contacting relation between the layer 92 and the surface of the windshield. This is, of course, additionally important under conditions wherein the upper area of the windshield has been bent about the longitudinal axis thereof.

It is to be understood that the form of the invention herewith shown and described is to be taken as a preferred embodiment of the same, and that various changes in the shape, size and arrangement of parts may be resorted to without departing from the spirit of the invention.

We claim:

1. In apparatus for attaching a member to a glass sheet,
    (a) a lever bar,
    (b) pivot means carried intermediate the ends of said bar for resting the same on said sheet for swinging movement of one end of said bar toward and away from a face of said sheet, and
    (c) a carrier block associated with said end of said bar for supporting said member in attaching relation to said face of said sheet as said bar end moves theretoward.

2. Apparatus as defined in claim 1, in which means is also provided for locating said lever bar in a predetermined position relative to said sheet.

3. Apparatus as defined in claim 1, in which there is provided a device extending transversely of said bar and provided with portions engageable with said sheet at opposite sides of said bar for locating said bar in a predetermined position relative to said sheet.

4. Apparatus as defined in claim 1, in which means is provided for urging said bar end toward said sheet face.

5. Apparatus as defined in claim 1, in which a weight is associated with the opposite end of said bar for urging said first-mentioned end toward said sheet face.

6. Apparatus as defined in claim 1, in which the means for mounting said bar on said sheet for swinging movement thereof comprises a vertical extension from said bar intermediate its ends, an extension from said vertical extension at substantially right angles thereto toward said end of said bar, and a fulcrum carried by said right angled extension and adapted to engage the opposite surface of said sheet.

7. Apparatus as defined in claim 6, in which said fulcrum is cylindrical in shape.

8. Apparatus as defined in claim 1, in which said carrier block is recessed to receive and interfit with portions of the member to be attached to the windshield.

9. Apparatus as defined in claim 1, in which a ball and socket joint is provided between adjoining faces of said lever bar and said carrier block to space one from another and permit a member supported by said carrier block to accommodate itself to the surface of the glass sheet to which it is to be attached.

10. In apparatus for attaching a member to a horizontally supported glass sheet,
    (a) an elongated bar having one end adapted to extend under said glass sheet while its opposite end is positioned outwardly thereof,
    (b) an extension from said bar intermediate said ends shaped to extend past the edge of said glass sheet and over the upper surface thereof,
    (c) a fulcrum carried by said extension and engageable with said upper sheet surface,
    (d) a carrier block for supporting said member to be attached to said glass sheet associated with the first mentioned end of said bar,
    (e) means for loosely securing said block to said bar,
    (f) a ball between and fitting into sockets in the adjoining faces of said bar and said block and spacing the same, and
    (g) a weight associated with the opposite end of said bar.

11. A device for locating and mounting a rear view mirror bracket on a windshield comprising a fulcrum engageable with a windshield surface, a lever bar suspended from said fulcrum and a carrier block for supporting said bracket associated with one end of said bar.

12. A device as defined in claim 11, in which said fulcrum is cylindrical in shape, said carrier block faces said fulcrum and is recessed to receive and interfit with said bracket, and there is also provided means engageable with said windshield for locating said bar relative thereto, and a weight associated with the other end of said bar.

13. A locator device of the character described for attaching a rear view mirror bracket to the inner surface of a windshield with said bracket including a mounting base portion and an arm terminating in a ball-shaped end, comprising
    (a) an elongated lever bar,
    (b) a carrier block arranged at one end of the lever bar for supporting a bracket,
    (c) means supporting the block with the vertical axis thereof normally coincident with a vertical plane in the longitudinal axis of the lever bar, (d) a weighted member at the opposite end of the lever bar,
(e) means on said bar having gauging surfaces for accurately locating the lever bar with said longitudinal axis at a right angle to the proximate edge of the windshield,
(f) said locating means being adjustably inwardly spaced from the vertical axis of the block the predetermined distance said bracket is to be spaced from said edge of the windshield, and
(g) means adapted to support the locator device bodily with reference to the outer surface of the windshield.

14. A locator device as claimed in claim 13, in which
(a) the carrier block is formed with a major top surface in one horizontal plane and a minor top surface in a parallel horizontal plane in downwardly stepped relation thereto,
(b) said major top surface being formed with a first recess having an outline substantially conforming to the area of the base portion of a bracket,
(c) a bottoming recess of smaller area is formed with the carrier block to form a shoulder portion of the first recess to support said base portion therein,
(d) said minor top surface being formed with a hemispherical recess conforming to the spherical surface of the ball-shaped end of the bracket,
(e) said first recess and hemi-spherical recess being in open communication with one another through the bottoming recess to freely accommodate the arm of the bracket, and means supporting the carrier block on the lever bar for pivotal movement around the vertical axis thereof.

15. A locator device as claimed in claim 14, in which
(a) the proximate upper surface of the lever bar is formed with a hemi-spherical socket,
(b) a ball-shaped support member in said socket,
(c) the lower surface of the carrier block having similarly formed hemi-spherical socket of lesser volume than the first hemi-spherical socket to receive the support member and to support the carrier block in upwardly spaced relation from the surface of the lever bar, and
(d) means retaining the carrier block on the ball-shaped support member while permitting relatively free pivotal movement of the carrier block thereon.

No references cited.

DOUGLAS J. DRUMMOND, *Primary Examiner.*